A. J. SCHUBERT.
AUTOMOBILE JACK.
APPLICATION FILED APR. 20, 1917.
1,248,929.
Patented Dec. 4, 1917.
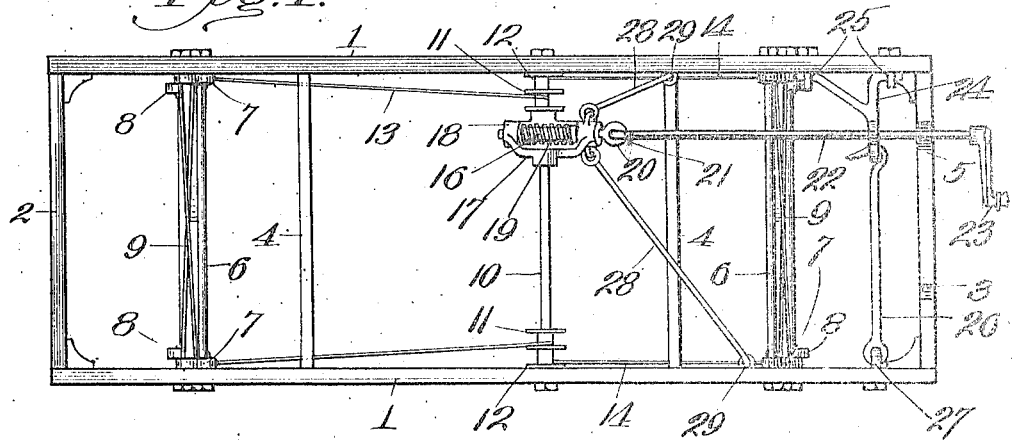
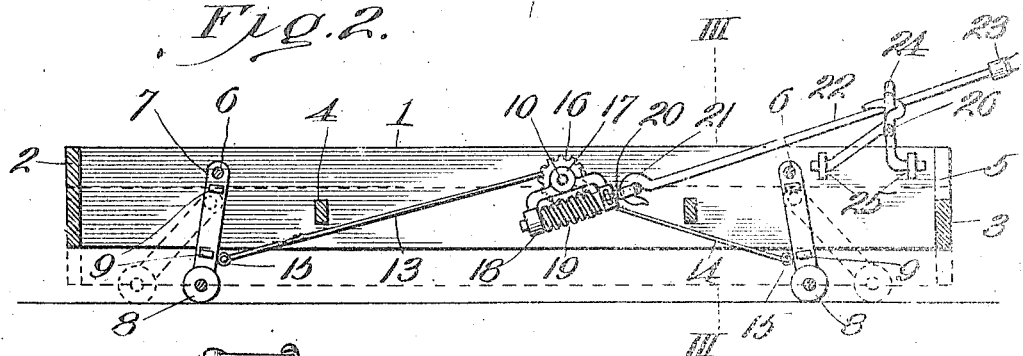
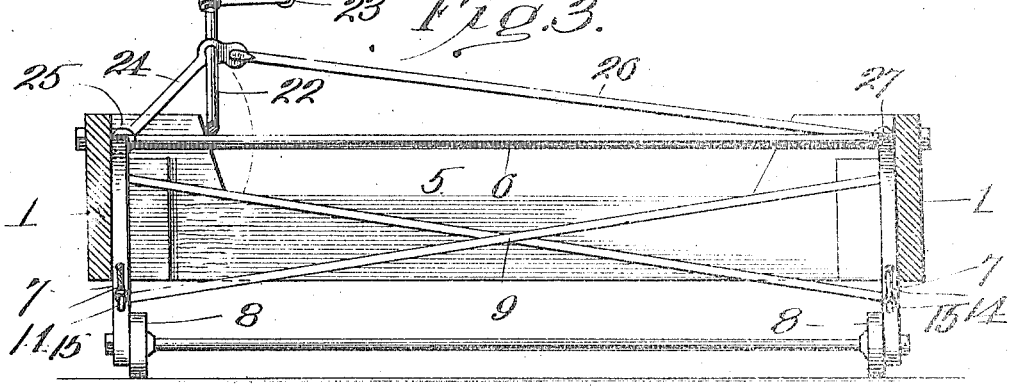
INVENTOR
A. J. Schubert
BY
George Thorpe
ATTORNEY

UNITED STATES PATENT OFFICE.

ALBERT J. SCHUBERT, OF KANSAS CITY, MISSOURI.

AUTOMOBILE-JACK.

1,248,929.

Specification of Letters Patent.

Patented Dec. 4, 1917.

Application filed April 20, 1917. Serial No. 163,529.

*To all whom it may concern:*

Be it known that I, ALBERT J. SCHUBERT, a citizen of the United States, residing at Kansas City, in the county of Jackson and State of Missouri, have invented certain new and useful Improvements in Automobile-Jacks, of which the following is a specification.

This invention relates to automobile jacks, and more especially to that class adapted for lifting a car from the floor of a garage to prolong the period of service of the tires by relieving them of the weight of the car when the same is not in use, and my object is to produce a simple, cheap, and efficient jack of the type outlined, over which the car can be run forward or backward.

To this end the invention consists in the novel construction, combination and formation of the parts as hereinafter described and claimed; and in order that it may be fully understood, reference is to be had to the accompanying drawing, in which:

Figure 1, is a top plan view of an automobile jack embodying the invention.

Fig. 2, is a central longitudinal section of the same, with certain braces omitted.

Fig. 3, is an enlarged transverse section taken on the line III—III of Fig. 1.

In the said drawing, 1 indicates the sides and 2 and 3 end braces connecting and forming in conjunction with said sides, a rectangular frame, and said frame is preferably braced at intermediate points by cross bars 4, it being noted in this connection that the end bar 3 is formed with a recess 5 in its upper edge, for a purpose which hereinafter appears.

Pivoted at 6 to the side bars 1 of the frame, and preferably within the latter, are lifting legs 7 mounted with their lower ends upon small wheels or rollers 8, opposite lifting legs being connected rigidly together so as to move in unison, by suitable cross braces 9.

Extending transversely of the frame and journaled in the side bars thereof, is a shaft 10, and rigidly secured upon the same within but adjacent the sides thereof, are winding drums 11 and 12, and secured to and leading from the drums 11 and 12 respectively, but at opposite sides of the same, are cables or chains 13 and 14, the same being connected at 15 to their respective lifting legs.

To operate the shaft and effect the winding of the cables or chains upon the said drums respectively, for the purpose of moving the lifting legs from substantially the positions shown by dotted lines Fig. 2 to substantially the position shown by full lines same figure, and thereby effect the raising of the jack, the following mechanism is provided: 16 is a worm wheel rigidly secured on shaft 10, 17 is a bracket through which the shaft rotatably extends, and which terminates in bearings 18 for the reduced ends of a worm 19 enmeshed with the worm wheel.

The worm extends at an angle and at its higher end, terminates in an eye 20, detachably engaged by the hook 21 formed on one end of a shaft 22 which in operative position, continues the inclination of the worm and extends at a suitable height over the end of the jack provided with the recess 5, and is provided at its extremity with an operating handle 23.

Near the handle end said shaft is loosely journaled in a bracket 24 pivoted at its ends to eye bolts 25 secured to the adjacent side of the frame, and said bracket is braced in operative position as shown by Figs. 1 and 3, by a brace hook 26 pivoted to an eye bolt 27 secured to the opposite side of the frame. To take up the end thrust on the worm when the same is operated to raise the car, a pair of inclined braces 28, are secured to what may be termed the rear end of the worm shaft, and extend divergingly rearward therefrom and are secured at 29 to the side bars of the frame.

When the device is arranged to receive a car to be jacked up, the brace hook 26 is disengaged from the pivoted bracket 24 so that said bracket may be swung downward until the shaft 22 extends through the recess 5 in the underlying end bar 3, said shaft being so turned that the crank handle shall not project beyond the plane of the upper side of the jack, which of course will be so proportioned that a car shall have ample clearance over it, it being preferable that in disposing a car over the jack, that it shall travel in the direction indicated by the arrow, Fig. 2, as it is generally more convenient to manipulate a jack from the rear end of a car than from the front end.

The jack preferably should exceed considerably the length of the car between the axles thereof, so that after the car is disposed above the jack, it will be convenient to swing the bearing bracket 24 with the shaft journaled therein to elevated position, and to brace the same in such position by means of pivoted hook 26. The operator now by giving the crank a sufficient number of turns, effects rotation of the winding drums and the adjusting of the lifting legs toward upright position until the car is lifted sufficiently to clear the floor. When the car is to be lowered, the crank handle is turned in the opposite direction to permit the car to move downward until it is again supported by its wheels. The operation is of course continued so as to lower the frame enough to permit the car to pass over it without conflict at any point.

From the above description it will be apparent that I have produced a simple, strong, durable, and inexpensive jack for use with automobiles and other vehicles, and it obviously is susceptible of modification in form, proportion, detail construction, and arrangement of parts without departing from the spirit and scope of the appended claims.

I claim:

1. A jack for lifting automobiles and the like comprising a suitable frame work, lifting legs pivoted at their upper ends to said frame work at opposite points and provided with wheels at their lower ends, a transverse shaft journaled in the frame, oppositely extending flexible connections between said shaft and said legs respectively, a worm wheel rotatable with said shaft, a worm extending longitudinally of the frame and enmeshed with the worm wheel, means supporting said worm, a shaft having a loose pivotal connection with said worm at one end thereof and extending upwardly and rearwardly beyond the adjacent end of the frame, an operating handle for said shaft, a pivoted bearing bracket for said shaft, and a brace detachably engaging said bracket to support the shaft in operative position.

2. A jack for lifting automobiles and the like, comprising a suitable frame work, lifting legs pivoted at their upper ends to said frame work at opposite points and provided with wheels at their lower ends, a transverse shaft journaled in the frame, oppositely extending flexible connections between said shaft and said legs respectively, a worm wheel rotatable with said shaft, an inclined worm enmeshed with said wheel and rotatably journaled, a shaft having a loosely pivoted connection with the elevated end of said worm, a pivoted bracket mounted on the frame and forming a bearing for said shaft and a movable brace detachably secured to said bracket and also mounted upon said frame.

In testimony whereof, I affix my signature.

ALBERT J. SCHUBERT.